Figure 1:
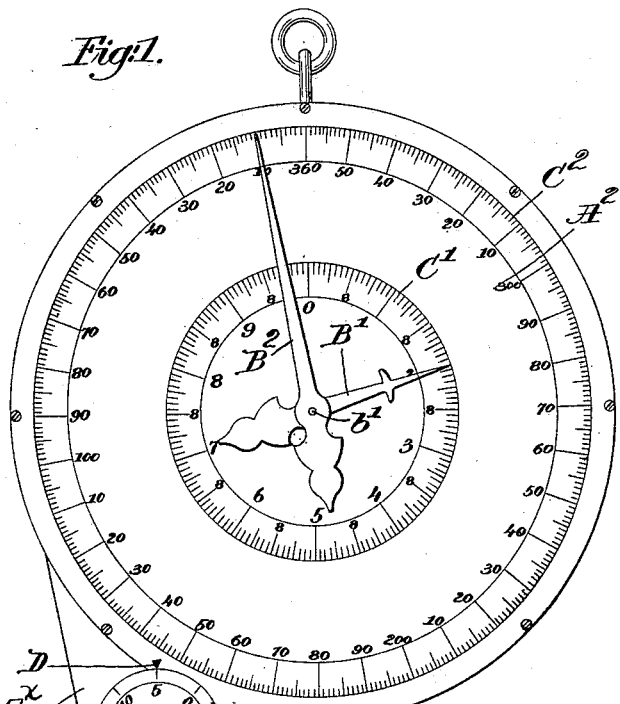

(No Model.) 2 Sheets—Sheet 1.

H. E. SWIFT.
PRICE COMPUTING APPARATUS.

No. 545,110. Patented Aug. 27, 1895.

Witnesses.
Fred S. Greenleaf.
Thomas J. Drummond.

Inventor:
Horace E. Swift.
by Crosby & Gregory
attys (No Model.) 2 Sheets—Sheet 2.

H. E. SWIFT.
PRICE COMPUTING APPARATUS.

No. 545,110. Patented Aug. 27, 1895.

Witnesses.
Fred S. Greenleaf.
Thomas J. Drummond.

Inventor:
Horace E. Swift.
by Crosby & Gregory
Attys.

UNITED STATES PATENT OFFICE.

HORACE E. SWIFT, OF BOSTON, MASSACHUSETTS, ASSIGNOR TO THE JONES-SWIFT MANUFACTURING COMPANY, OF PORTLAND, MAINE.

PRICE-COMPUTING APPARATUS.

SPECIFICATION forming part of Letters Patent No. 545,110, dated August 27, 1895.

Application filed September 24, 1894. Serial No. 523,901. (No model.)

*To all whom it may concern:*

Be it known that I, HORACE E. SWIFT, of Boston, county of Suffolk, State of Massachusetts, have invented an Improvement in a Price-Computing Apparatus, of which the following description, in connection with the accompanying drawings, is a specification, like letters and figures on the drawings representing like parts.

This invention relates to that class of apparatus wherein the price of an article measured is indicated to the eye, the indicated price varying according to the number of units in the article and the unit price thereof.

Interest-calculators and analogous apparatus have been made on the same general principle—that is to say, a disk has had placed upon it in particular arrangement a series of numbers resulting from the multiplication together of two other numbers, one representing the number of units, as for instance, pounds, feet, dollars, &c., the other number representing price per unit, rate of interest, and so on. All such devices, so far as I am aware, include this precalculation, and more or less attention has to be given by the operator to secure the proper results, and frequently computation must be made by the operator in order to secure the desired result.

My invention has for its object the production of a simple, compact, and automatic price-computing apparatus adapted to indicate the number of units in the goods or article measured, and provided with mechanism automatically actuated to indicate the aggregate price of the measured goods according to the unit price thereof, a controlling device for the computing mechanism and under control of the operator being adjustable according to the unit price of the goods. By setting the controlling device at zero the computing mechanism is rendered inoperative and the apparatus may be used to measure the number of units in the goods and to indicate the same, and when rendered operative by such controlling device the computing mechanism is actuated by the measuring mechanism, and both the number of units in and the aggregate price of the goods measured will be indicated simultaneously to the operator.

In accordance therewith my invention consists in the combination and arrangement of parts, as more fully described hereinafter in the specification, and particularly pointed out in the claims.

Figure 7:
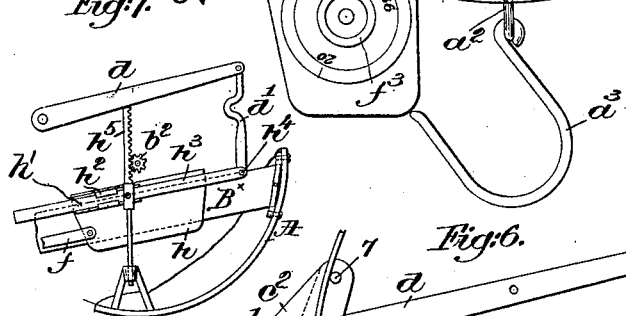
Figure 6:
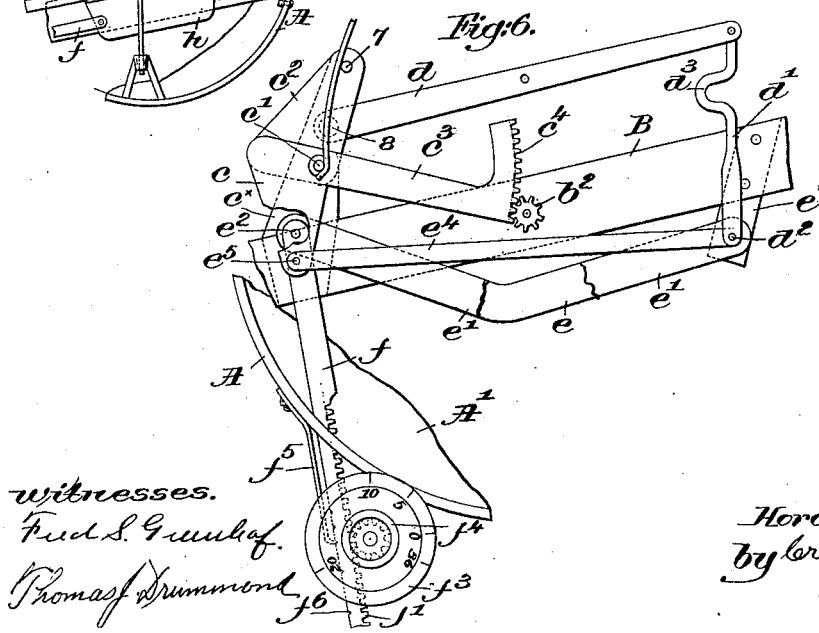
Figure 2:
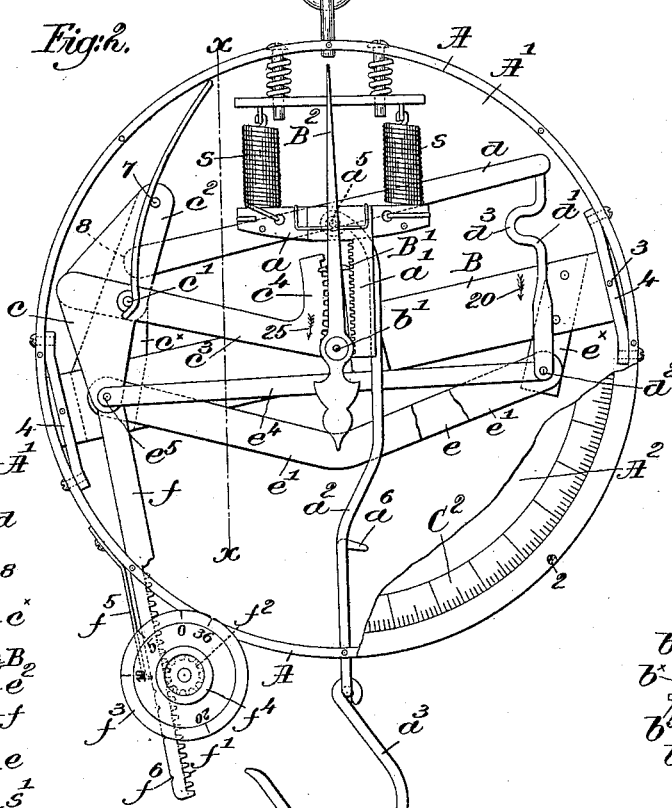
Figure 4:
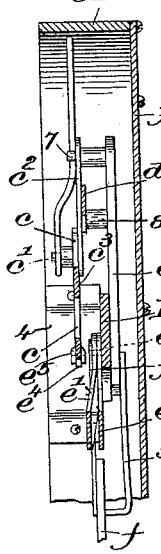
Figure 5:
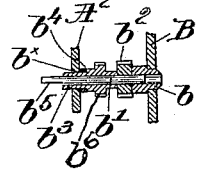
Figure 3:
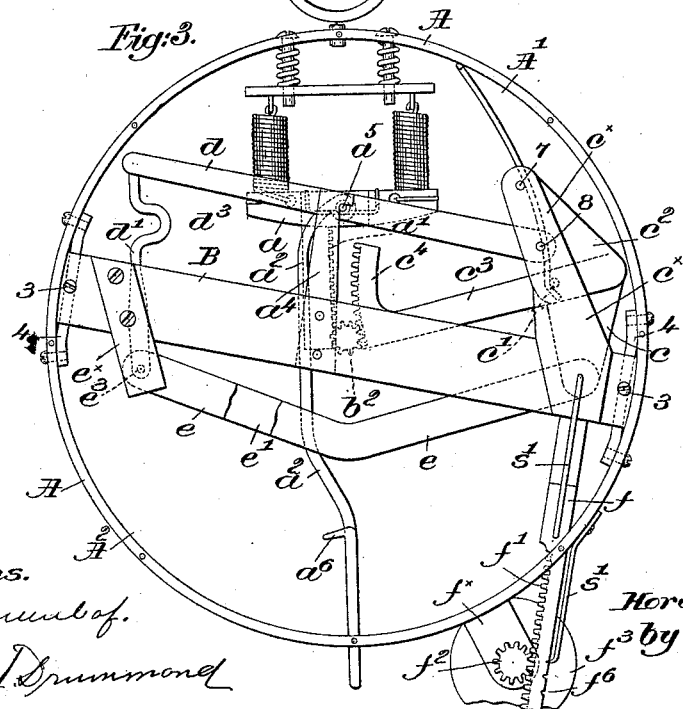

Figure 1 represents in front elevation one form of apparatus embodying my invention, such embodiment thereof being particularly adapted for weighing articles. Fig. 2 is a similar view of the apparatus shown in Fig. 1 with the greater part of the face or dial broken out to show clearly the operating mechanism and the controlling device set at zero. Fig. 3 is a rear elevation of the apparatus with the back plate removed. Fig. 4 is a partial section taken on the line $x\,x$, Fig. 2, looking toward the left. Fig. 5 is a vertical sectional detail to be described. Fig. 6 is a view of a portion of the operating mechanism in slightly different relative position, the controlling device being set forward, as will be described; and Fig. 7 is a detail view of a modification to be described.

I have herein shown my invention as embodied in that form of weighing apparatus known as "spring-scales," and consisting of a case A, back plate A' and front plate or dial $A^2$, the case A being herein shown as circular in its general form, to which the front and back plates are secured in suitable manner, as by screws 1 and 2, respectively. A bridge B is secured at its ends by screws 3 to supports 4 attached to the inside of the case A, and extends across the center of the same, the said bridge having secured to it a hub or boss $b$ to form a bearing for a pintle $b'$ (see Fig. 5) having fast thereon a pinion $b^2$, the said pinion resting on the end of the hub and being held from longitudinal movement by a sleeve $b^3$ loose on the pintle $b'$ which is in the line of the central axis of the case A.

The sleeve $b^3$ is shouldered at $b^4$, upon which rests an annular bearing $b^\times$ secured to the inner side of the face-plate $A^2$, the end of the sleeve extending through an opening in said face-plate and squared or otherwise suitably shaped to receive thereon a pointer B', the outer end of the pintle $b'$, which, as shown in Fig. 5, projects beyond the sleeve, being slabbed off at $b^5$ to receive thereon a pointer $B^2$ (see Figs. 1 and 2,) said pointers B' and $B^2$ moving across the outer side of the face-plate $A^2$ and co-operating, respectively, with two scales C' and C². (Indicated upon said face-plate.) In Fig. 1 the scale C' is graduated and marked with the numerals from 0 to 9, and in the embodiment of my invention shown is intended to indicate the number of pounds and fractions of a pound in the goods or article weighed. The scale C² is divided, as herein shown, into three hundred and sixty equal parts and suitably numbered for convenience, said scale being adapted to indicate the aggregate price of the goods measured according to the unit price thereof, said unit price determining the adjustment of the controlling device, to be described, for governing the relative movement between the measuring and computing mechanism, also to be described.

The measuring or weighing mechanism is or may be of any well-known construction, and consisting primarily of an equalizing yoke $a$, suspended by springs $s$ from the case A and having rigidly secured to it a rack-bar $a'$ in engagement with a pinion $b^6$ fast on the sleeve $b^3$, and a hanger $a^2$ depending from said yoke is extended through the case A and provided with a hook $a^3$ or other similar device to sustain a scale-pan or other object. The bridge B has secured thereto a stop-plate $a^4$ to engage a projecting stud $a^5$ (see Fig. 3) on the yoke $a$ and limit its upward movement, while a suitable projection $a^6$ on the depending hanger or arm $a^2$ bears against the case and limits outward movement of said hanger.

From the foregoing it will be obvious that when the yoke $a$ is drawn toward the center of the case the rack-bar $a'$ will cause the pinion $b^6$ to rotate the sleeve $b^3$ and thereby the pointer B', the strength of the springs $s$ being so regulated that the said pointer B' will move over the scale C' and properly indicate thereon the number of pounds-pressure put upon the weighing apparatus.

The computing mechanism comprises an actuator (shown in Figs. 2, 3, and 6 as an elbow-lever $c$,) pivoted upon a stud $c'$ on a plate $c^2$, supported upon short posts 7 and 8 fast on an offset $c^x$ rigidly secured to or forming part of the bridge B, the said actuator having an arm $c^3$, provided at its outer end with a segmental rack $c^4$ to engage the pinion $b^2$ fast on the pintle $b'$, whereby movement of the actuator on its pivot will, through said segmental rack and intermeshing pinion, cause rotation of the pintle $b'$ and thereby move the pointer B² around the scale C².

A lever $d$, having its fulcrum on the post 8 and pivotally connected by the stud or projection $a^5$ to the yoke $a$ is rocked or swung by the movement of the measuring mechanism described, and this rocking movement is communicated to the actuator $c$ of the computing mechanism by means of a link $d'$ and a lever having a movable fulcrum. Owing to the fixed fulcrum of the lever $d$ the stud $a^5$ will move in the arc of a circle, but the springs $s$ permit the slight lateral movement of the yoke $a$ made necessary by the curved path of the stud. In Figs. 2, 3, 4, and 6 said lever is shown as composed of two like arms $e$ and $e'$, pivotally connected, as shown in Figs. 4 and 6, at $e^2$ by a suitable pin or rivet, the opposite end of the arm $e$ being pivoted at $e^3$ to an offset $e^x$ secured to or forming part of the bridge B, said pivotal point $e^3$ being fixed. The free end of the arm $e'$ is pivotally connected at $d^2$ to the link $d'$, and also to one end of an arm $e^4$, and the other end of said arm $e^4$ is pivoted at $e^5$ to the actuator $c$. As shown in Figs. 2 and 3, the parts are in such position that the pivotal points $e^2$ and $e^5$ are in alignment, the point $e^2$ being covered by the parts over it and movement of the link $d'$ by the measuring apparatus in the direction of the arrow 20, Fig. 2, will merely rock or swing the arms $e'$ and $e^4$ about their respective pivots $e^2$ and $e^5$, without causing any movement of the actuator $c$ upon its pivot, and consequently no movement of the pointer B² will take place. If, however, the point of connection $e^2$ of the arms $e$ and $e'$, which point constitutes the movable fulcrum of the compound lever, is moved out of alignment with the pivot $e^5$, movement of the link $d'$ in the direction of the arrow 20 will cause the actuator $c$ to be turned about its pivot in the direction of the arrow 25, Fig. 2, to rotate the pointer B² in proportion to the amount of such movement. This movement of the actuator will be, obviously, proportional to the distance between the movable fulcrum $e^2$ and the normal position of the pivot $e^5$. The greater the distance between them the greater the swing of the pointer. I have provided a controlling device to adjust the position of said fulcrum, said controlling device, as herein shown, consisting of a bar $f$, pivoted at $e^2$, to the arms $e$ and $e'$, and provided at its outer end with rack-teeth $f'$ to engage a pinion $f^2$ on a shaft mounted in suitable bearings in a bracket $f^x$ secured to the exterior of the case, the shaft of the pinion having fast thereon a dial-plate and a suitable thumb-nut $f^4$, by which it may be rotated, rotation of the thumb-nut and pinion causing the bar $f$ to move away from or toward the normal position of the pivotal point $e^5$, and thereby moving the fulcrum $e^2$. In order to prevent accidental movement of the bar $f$, I have provided a rack therefor, (shown as a spring-finger $f^5$,) adapted to engage one another of a series of notches $f^6$ in the outer end of the bar, said notches being located or spaced upon the bar to correspond with the graduations upon the dial $f^3$.

The dial $f^3$, as shown in Figs. 1, 2, and 6, is graduated from 0 up to 36, though any other graduation may be used, as desired, and the notches $f^6$ in the bar correspond in their position to the position of the graduations 0, 5, 10, &c., on the dial, so that when one of said graduations—as, for instance, 5 in Fig 1—is brought opposite the indicating-point D on the face-plate $a^2$ the second notch $f^6$ on the bar will be engaged by the spring-finger $f^5$, and the movable fulcrum $e^2$ will be thereby adjusted in position to correspond to a unit's price equivalent to 5. With such adjustment, if an article, for instance, weighing two pounds is hung upon the hook $a^3$ the pointer B' will, through the operation of the measuring mechanism, be brought around opposite the point 2 on the scale C', and the computing mechanism will, through its connections with the measuring mechanism, turn the pointer $B^2$ until it is opposite the graduation 10 on the scale $C^2$, and if said latter graduations represent cents it will indicate that the aggregate price of two pounds at five cents per pound, or units, is ten cents, and so on for any number of pounds which may be weighed up to the limit of the apparatus. If the units price is ten, twenty, or some other number, the dial $f^3$ will be turned until the appropriate numbers 10, 20, &c., thereon is opposite the indicating-point D, and the operation will be the same as before, it being remembered that every movement of the variable fulcrum $e^2$ alters the ratio of movement between the pointers B' and $B^2$.

In Fig. 6 the dial $f^3$ of the controlling device is shown as locked in position corresponding to the unit price 10, and the position of the movable fulcrum $e^2$ is also shown, all the parts being at rest, and in Figs. 2, 3, and 6 one or other of the arms $e$ $e'$ of the compound lever has been broken out to show the other arm beyond. In Fig. 6 the measuring mechanism has been omitted entirely in order to avoid confusion.

The link $d'$ is shown as bent at $d^3$, whereby slight adjustment may be had in setting up the apparatus, the link being lengthened or shortened by opening or drawing together the said bend $d^3$.

The teeth of the racks $a'$ and $c^4$ are of such number that the pointers B' $B^2$ may be moved through one complete revolution, although it is obvious that, if desired, the arrangement of the teeth on the racks and their respective pinions $b^2$ and $b^6$ might be such that the pointers could be rotated more than once. Such construction, however, might tend to confusion, as the scales C' and $C^2$ would have to be provided with a plurality of said figures.

While I have shown my invention as embodied in a weighing-scale, it is obvious that it may be used otherwise for computing, for the measuring mechanism will still indicate the number of units in the goods or article measured, and the computing mechanism will indicate the aggregate price of such units according to the unit price.

The compound lever, composed of the arms $e$, $e'$, and $e^4$ and the link $d'$, forms the connection between the measuring and computing mechanism, and are so designated in the claims.

A spring-finger $s'$, secured to the rear side of the bar $f$, bears against the back of the jacket or projection $c^\times$ and serves as a brake upon the movement of said bar, which latter is extended through a suitable opening in the case A. An enlargement $A^\times$ of the case (shown only in Fig. 1) surrounds the pinion $f^2$ and its support and serves to protect the same and the rack $f'$ from dust, dirt, &c.

From the foregoing it will be seen that when the controlling device is set at any other point than zero the computing mechanism will be in operative position and that the number of units measured and the aggregate price thereof will be indicated simultaneously upon the face of the apparatus, while if the controlling device is set at zero the computing mechanism will be thrown out of operation and only the measuring mechanism will operate.

In the modification shown in Fig. 7 an auxiliary bridge $B^\times$ is secured to the case and supports thereon a slide-block $h$, longitudinally movable in either direction on the bridge to which block is pivotally connected at $h'$ by a suitable pin, shown in dotted lines, a guide $h^2$ longitudinally grooved to receive loosely therein a lever $h^3$, pivoted at $h^4$ to the link $d'$ of the measuring mechanism, a portion of the edges of the groove being shown as overturned to retain the lever $h^3$ in the groove. This lever has pivoted thereto a rack-bar $h^5$, which forms in this instance the actuator of the computing mechanism, said rack engaging and rotating the pinion $b^2$. The slide $h$ is moved longitudinally upon the auxiliary bridge $B^\times$ by means of a controlling mechanism similar to that shown in Figs. 2, 3, 4, and 6, whereby the position of said slide upon the bridge may be regulated. The lever $h^3$ has thus a variable fulcrum $h'$, for said fulcrum moves with the slide $h$ when it is moved and according to the position of the fulcrum relative to the pivoted connection of the lever $h^3$ and rack-bar $h^5$, determined by the controlling device, the lever $h^3$ will be moved through a greater or smaller arc by the measuring mechanism, to thereby cause the proper relative movement of the pointer $B^2$, according to the unit price of the goods, it being understood that the guide $h^2$ will be swung about its pivot $h'$ by the swinging movement of the lever $h^3$, said lever and guide thus having the same fulcrum. As the slide $h$ is moved away from or toward the center of the case the guide $h^2$ will slide along the lever $h^3$ and thereby prevent it from binding.

My invention is not restricted to the precise construction herein shown, as it is obvious that it may be varied in particulars without departing from the spirit and scope of my invention.

I claim—

1. In a price computing apparatus, the following instrumentalities, viz;—mechanism to measure and indicate the number of units in the article measured; movable computing mechanism to indicate the aggregate price of the measured article; a compound lever having a fixed fulcrum for one extremity and pivoted to the computing mechanism at its other extremity; a connection between the measuring mechanism and one intermediate joint of said lever, whereby it is moved; and an adjustable fulcrum for the other joint, movable in accordance with the unit price of the article, to control the movement of the computing mechanism relative to the measuring mechanism, substantially as described.

2. In a price computing apparatus, the following instrumentalities, viz;—mechanism to measure and indicate the number of units in the article measured; movable computing mechanism to indicate the aggregate price of the measured article; a compound lever having a fixed fulcrum for one extremity and pivoted to the computing mechanism at its other extremity; a connection between the measuring mechanism and one intermediate joint of said lever, whereby it is moved; an adjustable fulcrum for the other joint; and a manually operable controlling device to govern the position of said adjustable fulcrum, whereby the relative movement of the measuring and computing mechanisms is controlled by the unit price of the article measured, substantially as described.

3. In a price computing apparatus, the following instrumentalities, viz;—mechanism to measure and indicate the number of units in the article measured; movable computing mechanism to indicate the aggregate price of the measured article; a compound lever having a fixed fulcrum for one extremity and pivoted to the computing mechanism at its other extremity; a connection between the measuring mechanism and one intermediate joint of said lever, whereby it is moved; a rack bar to which the other joint is pivoted; and a graduated rotatable disk geared to said rack-bar and having the various prices per unit indicated upon it, whereby manual setting of said disk to a given unit price will move the rack-bar and joint of the lever into position to cause relative movement of the measuring and computing mechanisms in accordance therewith, substantially as described.

4. In a price computing apparatus, the following instrumentalities, viz;—a dial having concentric graduated scales thereon to denote units of measurement and aggregate price of the article measured; a pintle provided with a pinion and a pointer for one of said scales; a sleeve rotatable on said pintle and having also a pinion and a pointer to co-operate with the other scale; measuring mechanism geared to one of said pinions to move the corresponding pointer to indicate the number of units in the article measured; and actuator geared to the other pinion to cause its pointer to indicate the aggregate price of said article according to the unit price thereof; connections between and pivotally connected to the measuring mechanism and said actuator, including a compound lever having a fixed pivotal support and a controllably supported intermediate joint; and means to control the position of said joint relative to the other joint and the point of attachment to the actuator, substantially as described.

In testimony whereof I have signed my name to this specification in the presence of two subscribing witnesses.

HORACE E. SWIFT.

Witnesses:
ADDISON W. JONES,
JOHN C. EDWARDS.